United States Patent Office

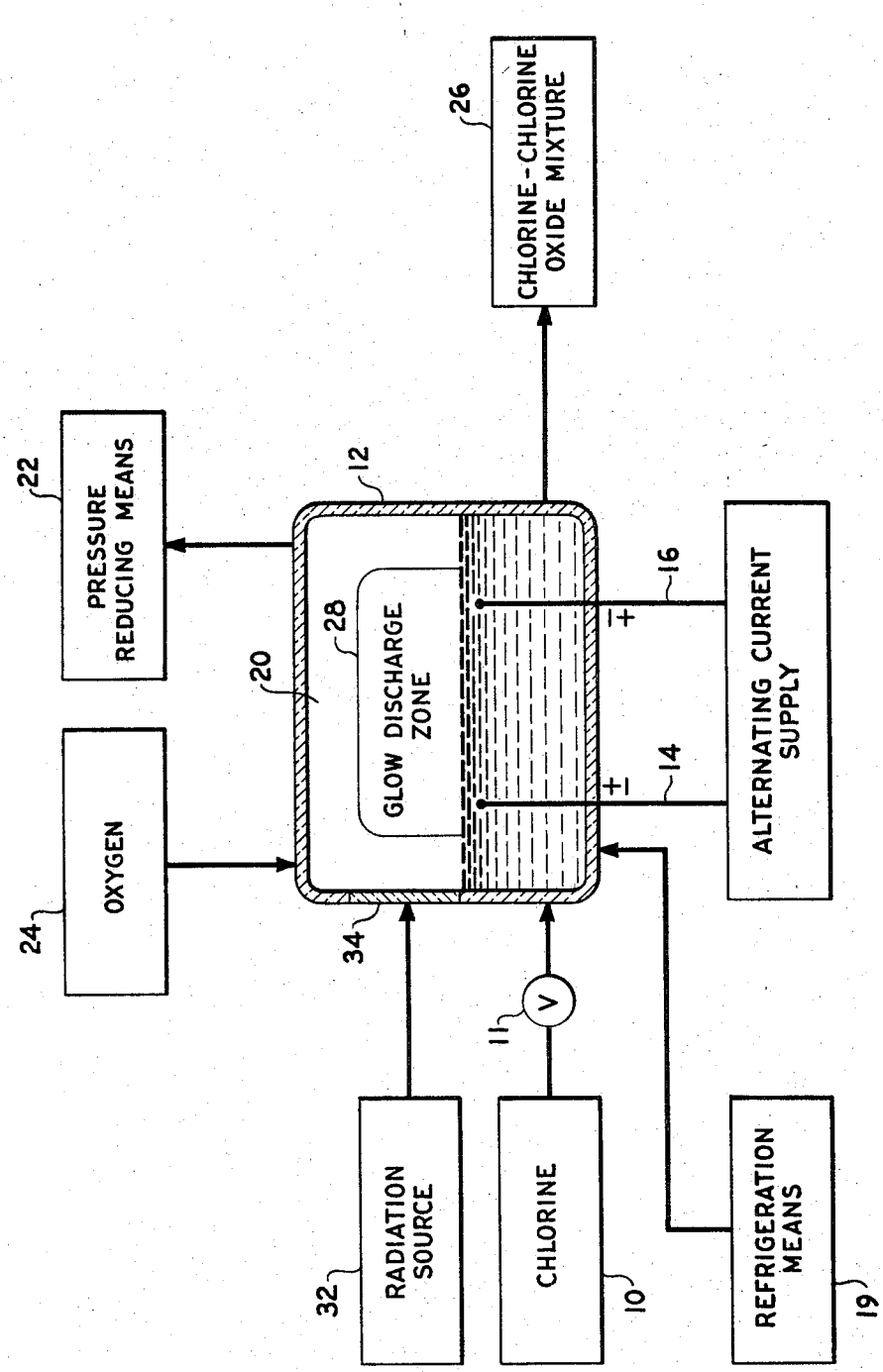

3,429,793
Patented Feb. 25, 1969

3,429,793
GLOW DISCHARGE PRODUCTION OF OXIDES OF CHLORINE
Emil J. Hellund, South Laguna, Calif., assignor to Hooker Chemical Corporation, Niagara Falls, N.Y., a corporation of New York
Filed Dec. 2, 1965, Ser. No. 511,198
U.S. Cl. 204—157.1       13 Claims
Int. Cl. B01j 1/10

This invention relates to the production of oxides of chlorine by means of a glow discharge and more particularly to the direct production of chlorine oxides from elemental chlorine and oxygen by reaction thereof in an electrical glow discharge and to products made and uses thereof.

Oxides of chlorine and especially chlorine dioxide have gained wide usage as bleaching agents for cellulosic materials, disinfectants, and for other purposes wherein their oxidizing effects are utilized. Previously, chlorine dioxide was produced by the reduction of chlorates, such as sodium chlorate, which generated chlorine dioxide as a gas. Such a process for producing chlorine dioxide was a multi-step reaction wherein sodium chloride was subjected to electrolysis in an aqueous solution to produce sodium chlorate. The sodium chlorate produced was then used to generate chlorine dioxide by reaction under strongly acidic conditions in the presence of a reducing agent.

The present invention relates to the direct reaction of elemental chlorine with oxygen to produce oxides of chlorine. An object of this invention is to provide a highly efficient method for reacting chlorine with oxygen to produce chlorine dioxide. Another object of this invention is to provide a continuous process for the production of chlorine dioxide from liquid chlorine and gaseous oxygen by subjecting liquid chlorine and oxygen to an electrical glow discharge. Still another object of this invention is to produce a mixture of chlorine oxides useful for bleaching. A further object is to provide an electrical glow discharge reaction between surfaces of reactant liquid or solid having electrodes submerged therein. These and other objects will become apparent to those skilled in the art from the description of the invention which follows.

In accordance with the invention, a process is provided for the production of an oxide of chlorine comprising subjecting elemental chlorine in the presence of oxygen to an electrical glow discharge wherein said chlorine is maintained at a temperature of less than about −35 degrees centigrade thereby maintaining the sum of the oxygen pressure and chlorine pressure at less than one atmosphere of pressure absolute. The present process is preferably effected wherein the electrical glow discharge is between electrodes immersed in liquid or solid chlorine and having oxygen in contact with the chlorine. In the most preferred embodiment, the glow discharge is produced by means of an alternating current from electrodes immersed in liquid chlorine.

The present invention provides a marked advantage over previous methods for producing chlorine oxides. One advantage immediately observed is the extremely high efficiency obtained in producing the oxides of chlorine, particularly chlorine dioxide, by the present method, based on the electrical power input. Thus, whereas previously chlorine dioxide was produced by a multistep electrical and chemical process in which energies were expended in producing an intermediate and subsequently a final product, the present method produces the desired product directly at efficiencies approaching 100 percent based on the electrical power expended.

The invention will be more clearly described with reference to the drawing which is a partial schematic and flow sheet showing the process of the present invention.

As shown in the drawing, liquid chlorine 10 is fed through reducing valve 11 to a reaction zone 12 having electrodes 14 and 16 submerged in chlorine 18 which is in either the liquid or solid state. Refrigeration means 19 is used to maintain the desired temperature and to control the total pressure. A reduced pressure zone 20 is maintained above liquid or solid chlorine 18. Pressure reducing means 22 reduce the total pressure within reaction zone 12 to within a range of about 5 microns up to about 30 millimeters of mercury pressure. Oxygen 24 is fed into the reduced pressure zone 20 initially to provide an oxygen partial pressure of about one to about 100 millimeters of mercury and subsequently after commencement of the reaction, at a controlled rate substantially equal to the reaction rate of the oxygen with the chlorine. The preferred method of operation is at a total chlorine and oxygen pressure of about 5 to 25 millimeters of mercury. A reaction is effected by producing a glow discharge between electrodes 14 and 16, thereby reacting oxygen with the chlorine. The reaction takes place at the gas-liquid or solid interface of chlorine 18 and the glow discharge zone 28.

The oxides produced are absorbed into chlorine 18 and may be subsequently removed as a chlorine-chlorine oxide mixture 26. During the reaction, the chlorine is maintained in the liquid or solid state, that is, at a temperature within the range of about −35 to −120 degrees centigrade or lower.

The glow discharge 28 is created and maintained above the chlorine between electrodes 14 and 16 by passing an alternating current between said electrodes.

The term "glow discharge" is used in its normal technical sense to mean an electrical discharge between an anode and a cathode wherein the cathode function is carried out by ion and/or photon bombardment of the cathode. The discharge is at ambient temperatures with little heating effect. A typical example of a glow discharge is a neon light.

The glow discharge is also characterized in that it is normally of low pressure but not necessarily of high vacuum, in that the discharge is sustained in the pressure range of about 5 microns to about 30 millimeters of mercury for a normal glow. Higher pressures can be used when external ionizing means are also employed. This discharge is of a self-sustaining type having flat voltage over amperage characteristics. By this is meant that small variations in voltage effect large variations in the current.

The chemical reactions produced in the glow discharge are due to electron transitions caused by electrons colliding with the electrons of the reacting atom or molecule to produce activated states thereof with no direct influence on the nuclear motions (Franck-Condon principle). The benefit gained by invoking such processes is the avoidance of direct heating of the atom or molecule to be reacted. The reactions run "cold," that is, near the temperature of the surroundings, i.e., near the temperature of the chlorine. Further descriptions of the glow discharge and other types of plasmas can be found in the book "The Plasma State" by E. J. Hellund, 1961, Reinhold Publishing Corporation.

The general procedure for effecting the reaction is by first evacuating the reduced pressure zone 20 and then filling the lower portion of reaction zone 12 with chlorine. Liquid chlorine is preferably used. However, solid chlorine can also be used, particularly in batch type reactions. The use of liquid chlorine provides a convenient means for continuous operation by continuously feeding, reacting and withdrawing chlorine through the reaction zone. Thus, replenishing amounts of chlorine can be continuously or intermittently fed to the reaction zone, while mixtures of chlorine and chloride oxides are continuously or intermittently withdrawn. The process can also be run continuously using solid chlorine by continuously withdrawing a surface layer of chlorine oxides as they are produced.

Upon feeding sufficient chlorine to the reaction zone 12 to cover electrodes 14 and 16 with chlorine, and maintaining the chlorine preferably at a temperature of about −100 to −75 degrees centigrade, oxygen is admitted into the reduced pressure zone 20 to provide a partial pressure of oxygen. The oxygen fed into the reduced pressure zone is normally in an amount to increase the pressure of the evacuated reactor by at least one millimeter of mercury and preferably about 5 to 30 millimeters of mercury. When auxiliary radiation sources are used such as an ultraviolet light or a chlorine discharge tube, higher pressures up to a total oxygen and chlorine vapor pressure of about one atmosphere can be used. Although the reaction can be effected using chlorine at a temperature within the range of about −35 to −120 degrees centigrade or lower, the temperature of the cholrine is preferably controlled to hold the total pressures within the prescribed limits. Therefore, the preferred temperature range is near the freezing point of chlorine or about −100 to −75 degrees centigrade.

The oxygen fed to the reaction zone is preferably as pure an oxygen as possible, e.g., over about 95 percent pure, because impurities in the oxygen will tend to reduce the efficiency of the reaction.

The voltage applied to the electrodes is preferably adjusted in power level to obtain a diffuse glow. The voltage employed is a function of the chlorine layer above the electrodes, the temperature, the geometry of the metal electrodes in the chlorine, the length of the oxygen column in the discharge zone and the pressure in the discharge zone. Normally, the voltage imposed between the electrodes is of a field gradient of about 100 to 300 volts per centimeter in the pressure range of about 5 to 25 millimeters of mercury. It is recognized that the voltage used can vary widely with the particular pressures and apparatus used being within a range of about 100 volts per centimeter at a pressure of about 5 millimeters of mercury to about 10,000 volts per centimeter at pressures approaching atmospheric.

The imposition of a potential on the electrodes induces a polarization of the chlorine dielectric. An electric field is produced in the gas as a result of the voltage at the electrode and the chlorine polarization. With moderate dielectric polarizability, the electric field penetrates the oxygen-gas section, that is, the glow discharge zone, and induces the breakdown and subsequent establishment of a plasma with activation of oxygen to form the radical O, vibrationally excited $O_2$, some $O_3$, and ions of these species. In addition, some Cl radical, vibrationally excited $Cl_2$, $Cl^+$, $Cl^-$, $Cl_2^+$, and $Cl_2^-$ will exist in the plasma phase.

The reaction of chlorine and oxygen results in a condensable phase favoring chlorine dioxide and to a much lesser extent other oxides such as $Cl_2O$, $ClO_3$, $Cl_2O_6$, $Cl_2O_7$, $Cl_2O_3$, and the like. This mixture of chlorine oxides provides a bleaching reagent which can be used as is or separated into the respective oxides. These compounds and mixtures are particularly useful for the bleaching of cellulosic materials including pulp as well as synthetic fibers and the like. The oxides can also be used in other applications wherein oxidizing ability is desired, such as in disinfecting and cleaning.

As the reaction proceeds, the chlorine oxides are absorbed in the chlorine, thus reducing the pressure in the discharge zone. In a continuous process, it is preferred to feed replenishing amounts of oxygen to the discharge zone at a rate such that the pressure is maintained substantially constant. The oxygen feed rate thereby provides a proportion of chlorine and oxygen such that the reaction is in a mole ratio of about 4:1 to about 20:1 chlorine to oxygen. The oxygen to chlorine ratio in the gas discharge zone is preferably in a mole excess of oxygen of about 10 oxygen to one chlorine.

During the reaction, somewhat higher efficiencies can be obtained by utilizing an ultraviolet or chlorine glow discharge radiation source to aid in maintaining the plasma during the zero phase of the alternating current. Such radiation sources are also preferably used when the total pressure in the glow discharge is above about 30 millimeters of mercury up to about one atmosphere absolute. The provided radiation eliminates quenching the plasma on every half cycle when alternating current is used. A suitable source of ultraviolet light is a quartz mercury vapor lamp. A chlorine glow discharge tube also provides a suitable radiation source. The ultraviolet or other radiation source 32 is located so that it radiates the glow discharge zone 28 through a quartz or lithium fluoride window 34.

The radiation source is preferably maintained out of phase with the alternating current such that the radiation tends to sustain the plasma between the zero phase of the alternating current. As such, the phase angle for the radiation, such as ultraviolet light, is preferably adjustable so that the best angle can be obtained during the glow discharge.

As the reaction progresses, a mixture of chlorine and chlorine oxides 26 is removed from the reaction zone 12. The oxides are separated, as by fractional distillation, by preferential absorption or other known process, and the chlorine is returned to the reaction zone for further reaction. Alternatively, the mixture can be used as such for various applications such as the bleaching of pulp.

The concentration of chlorine oxides in the mixture can be theoretically maintained at very high levels. The higher densities of the oxides compared to chlorine cause them to sink in the chlorine while the dielectric constant of chlorine and the magnetic drive cause a mixing action which continuously exposes new surfaces of chlorine for reaction. However, due to the instability of the oxides in concentrated conditions, it is preferred to limit the chlorine oxide concentration to about 20 percent or less, of the material in the liquid phase. If solid chlorine is employed, the oxides tend to concentrate at the solid surface from which they are preferably continuously removed from the discharge zone.

The electrodes used to bring the charge into the glow discharge zone may be any metal resistant to liquid chlorine and mixtures of chlorine and chlorine oxides. Because the chlorine is anhydrous, a great number of metals can be used, such as titanium, platinum, gold, silver, tantalum, low carbon steel, steel, chromium, nickel, copper, and the like, and alloys thereof. Stainless steel has been found to be a very suitable electrode material.

The geometry of the electrodes is preferably of the type which reduces the tendency to promote a channel breakdown of the chlorine layer above the electrodes thereby exposing the electrode to direct electrical attack. Numerous geometrical configurations can be used to avoid such channeling. Typical of such configurations are electrodes in the shape of a wire with a single wire for each electrode. The wires are placed parallel to each other with the discharge being effected along the length of the wire. Also, wires having wire projections extending therefrom to provide a discharge from the projections can be used, as well as numerous other configurations. The electrodes in the reaction zone can be as pairs or as a series of electrodes wherein the voltage is induced between electrodes by connecting the terminal electrodes to a source of electrical current.

The spacings of the electrodes can be varied as well as the depth thereof below the chlorine surface. The depth should be sufficient to avoid direct electrical attack thereon, such as could occur from exposure to oxygen in the discharge zone which could occur due to mild turbulence on the liquid surface. Placement of the electrode deep within the chlorine increases the impedance needlessly, thus increasing the voltage requirements. Thus, the placement depth can vary with the particular apparatus and reaction conditions from about 0.01 centimeter to about one centimeter. The distance between electrodes is more than the sum of the depth of the electrodes between which the discharge occurs or that distance required to produce the most desirable glow discharge in the gaseous reduced pressure zone. The distance between electrodes can thus be varied between about 0.02 centimeter to 20 or more centimeters.

In the commercial operation of the present process, a multitude or a bank of reactors can be used. These reactors can be stacked as trays or otherwise positioned so as to require a minimum of space. Also, the reactors can be increased in size and/or the number of electrodes or their effective size increased to thereby provide the desired production rate of product.

The reactor is constructed of a non-conducting inorganic material resistant to the powerful oxidizing action of chlorine dioxide and the chlorine. Glass and quartz have been found to be suitable materials for construction. Organics and metals are preferably avoided because their presence in appreciable amounts may reduce the yield of chlorine oxides.

The present process preferably uses alternating current to effect the glow discharge between the electrodes. Although direct current can be used, such a use would not be as desirable because the system polarizes rapidly, thereby diminishing propagation of the electrical field in the gaseous discharge area. Without such a discharge activation of the oxygen does not take place and no reaction ensues. The alternating current supply is normally 60 cycles per second, but can be at a lesser or higher rate. Alternating current rates of 20 to 100 kilocycles can be used with the preferred range being 50 to 1,000 cycles per second.

The reaction described preferentially produces chlorine dioxide. This is particularly advantageous in that of all the chlorine oxides, the dioxide has received the most study and is most widely used. The structure of this odd molecule is that shown in the following figure:

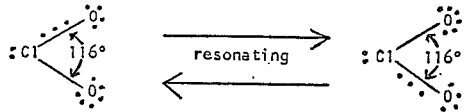

The Cl—O bond length is about 1.5 angstroms. The dissociation of $ClO_2$ to $ClO+O$ requires 2.5 electron volts. Further dissociation of ClO to Cl+O requires 1.9 electron volts. On combining the chlorine and oxygen into their standard molecular states, one recovers a net 1.8 electron volts as a measure of the height of the energy level of $ClO_2$ above the ground state of the constituents prior to combination.

Since the molecule has a long half life, it appears that there is a fairly large barrier to oxygen recombination within the molecule. The large separation of the oxygens demands only a relatively small barrier height to achieve the stability observed. Nevertheless, decomposition is observed to occur by thermal collisions at moderately elevated temperatures. This would tend to point to a rather wide barrier but with a small height. Therefore, it is considered that in view of such constraints intrinsic of the molecule, theory now explains the observation that synthesis of chlorine dioxide occurs preferably under moderate temperatures with activation for the reaction best supplied by electron collisions in which the atomic nuclei are not directly acted upon. Such activation is typically supplied in a glow discharge.

However, in effecting the reaction, it was found desirable to bring about the reaction with means that do not admit to restricting the activation per molecule to a single energy. In a glow discharge, there will be collisions with considerable excess energy for the reaction. A means of draining this energy away before the molecule reacts back to its original building blocks is provided. Such a means exists in the presence of "third bodies" in the reaction zone. These "third bodies" can be other quenching molecules such as $Cl_2$, $O_2$ or inert atoms such as a noble gas. Therefore, in the present process, a noble gas can be used in the discharge zone if desired. Clearly, for best results, the "quenching" molecules are present in adequate amounts and are cold, relative to the electron temperatures. However, the mean free path for electron collision is such that for the electric field employed, electrons will acquire the energy needed for the synthesis.

The competition between the quenching requirements and electron energy build-up in the electric field causes a compromise in relation to the pressure obtained in the discharge. At 10 millimeters of mercury pressure with the temperature at about 300 degrees Kelvin, the mean free path of an electron would be about $5 \times 10^{-3}$ centimeters. A field gradient of about 100 volts per centimeter would therefore provide an average of one-half electron volt per collision. With such collisions approximately, following a Maxwell-Boltzmann Distribution Law, a sizable proportion of the collisions would occur above 2 electron volts, leading to a measurable reaction in an oxygen rich mixture with chlorine.

A plasma is maintained in the presence of a multitude of channels for losing energy. These create their own particular demands upon the system in terms of special assessments against the voltage. Thus, importance of an efficient system designed to avoid excessive energy losses is clear, so as to improve the reaction yields. There are, however, limitations peculiar to the glow discharge as well as to any other discharge system relating to the electrode fall voltages. These are intrinsic to the plasma. At the cathode, electrons are regenerated while at the anode, ions lost by transport to the cathode are recreated. The same function exists in using either alternating or direct current. In these functions, there exists a degree of relative inflexibility in which only moderate improvements can be effected in relation to any given system by varying electrode materials and/or geometry.

Chlorine dioxide is favored in the present method as is seen from an examination of the relative ease of producing the various oxides by evaluating the energy required to take the reacting species to the energy level of chlorine oxides. It has been noted that about 1.8 electron volts are needed for the production of each $ClO_2$ molecule. As compared to the production of $ClO_3$, the energy required is calculated by using available bond dissociation data. Such data indicate that 6.81 electron volts are required to convert $ClO_3$ to $Cl+3O$. The reaction of Cl to $1/2\ Cl_2$ releases 1.23 electron volts while the conversion of 3O to $3/2\ O_2$ releases about 7.66 electron volts. The balance or net energy available in going to the ground state of the constituent species of $ClO_3$ is about 2.1 electron volts. This contrasts markedly with $ClO_2$. The differences in energies expressed thermally in terms of a difference in temperature of activation would be about 3,000 degrees Kelvin equivalent. In addition, because of the increased numbers of reactant species, the proportion of nonproductive collision processes would increase independently of the energy.

The following examples illustrate certain preferred embodiments of the present invention. Unless otherwise indicated, all parts and percentages used herein are by weight and all temperatures in the examples and claims are in degrees centrigrade.

EXAMPLE 1

The process of the present invention illustrated by the drawing is effected using a glass reactor having a liquid inlet means, a liquid outlet means, a gas inlet means and an evacuation outlet means. The reaction is commenced by evacuating the glass reactor to a pressure of about 5 microns of mercury prior to closing off the trapped vacuum. Liquid chlorine is admitted into the lower portion of the reactor to a level which covers the electrodes within the reactor with a layer of about 0.3 centimeter of chlorine. Electrodes of stainless steel wire in the form of a T wherein the discharge area is about 0.5 centimeter in length and about 0.08 centimeter in diameter, are placed parallel to each other at a distance of one centimeter apart. Before admitting, and while in the reactor, the liquid chlorine is refrigerated to a temperature of about −90 to −100 degrees centigrade to maintain the total pressure within the reactor at about one millimeter of mercury pressure. Oxygen is then admitted to a total pressure of about 10 millimeters of mercury.

A 110–120 volt 60 cycles per second alternating current supply is passed through a variac and step-up transformer to the electrodes within the reactor thereby providing an alternating current source of up to 15,000 volts. An ammeter and voltmeter is used to monitor the voltage and current parameters. The voltage imposed across the electrodes to produce the desired glow discharge is about 400 volts root mean square at an average current of about 5 milliamperes root mean square at 60 cycles per second. During the discharge, a color change is noted at the surface of the chlorine indicating a surface reaction. The reaction is effected at a rate such that the oxygen within the reactor is consumed in less than one second in producing chlorine oxides which are rapidly absorbed in the chlorine. Thus, to maintain the continuous reaction, oxygen is continuously fed into the discharge zone at a rate sufficient to maintain a relatively constant pressure of about 10 millimeters of mercury. Upon continuing the reaction, a mixture of liquid chlorine and oxides of chlorine is removed from the reactor at a rate such that the mixture contains a concentration of chlorine oxides in the range of about one to 10 percent. Replenishing amounts of liquid chlorine are fed to the reactor, at a rate commensurate with the withdrawal, thereby maintaining the depth of the chlorine layer above the electrodes approximately constant.

The reaction is highly efficient based on the current input in producing oxides, of which up to about 98 percent is chlorine dioxide. Additional oxides produced include $Cl_2O$, $Cl_2O_3$, $ClO_3$, $Cl_2O_6$ and $Cl_2O_7$.

EXAMPLE 2

The process of Example 1 is effected, but in addition, an ultraviolet light source produced by a 100 watt input quartz-mercury vapor lamp is located externally to the reactor immediately adjacent to a quartz window in the reactor such that the ultraviolet radiation passes through the quartz window in the reactor, thereby radiating the glow discharge zone. After initiating the reaction by passing an alternating current between the electrodes at a voltage of about 400 volts root mean square at an average current of 5 milliamperes root mean square at 60 cycles per second, the phase angle of the ultraviolet light is adjusted to obtain radiation waves out of phase with the alternating current cycle. By using the ultraviolet radiation, a reaction rate improvement of 5 to 20 percent is obtained due to aid in sustaining the plasma between the cycles of the alternating current.

EXAMPLE 3

The process of the present invention was effected in a batch type operation wherein a glass reactor in the shape of a U tube was used. The reactor had a volume of about 125 cubic centimeters. Stainless steel electrodes were placed in the ends of the reactor a distance of about 15 centimeters apart. Liquid chlorine was added to the reactor in an amount sufficient to cover the electrodes at both ends of the reactor with about 0.4 centimeter of chlorine. The electrodes were constructed of 0.08 centimeter diameter stainless steel wire and shaped to form a T. The electrode discharge surface, i.e., the top of the T, was about 0.5 centimeter in length. The electrodes were positioned in both ends of the reactor in a manner such that the T's were in the same plane. The temperature of the liquid chlorine in the reactor was reduced to −100 to −120 degrees centigrade thereby freezing the liquid chlorine within the reactor to a solid. The reactor was then evacuated to a total pressure of about 10 microns of mercury. Oxygen was then admitted into the reactor to increase the pressure to about 10 millimeters of mercury. An alternating current was passed between the electrodes from a 15,000 volt step-up transformer supplied with 110–120 volt 60 cycles per second alternating current. The voltage applied to the electrodes was regulated using a variac in line with the transformer. A diffused glow discharge was produced at 1500 volts root mean square and an average current of 5 milliamperes root mean square. Additional amounts of oxygen were added to maintain the pressure at about 10 millimeters of mercury as the reaction progressed. The oxides formed on the surface of the chlorine as was indicated by a red color and were immediately absorbed into the chlorine. Without the additional amounts of oxygen, the oxygen present within the reactor was reacted in less than one second.

In addition to adding oxygen, chlorine gas can also be introduced into the reactor either separately or in admixture with the oxygen. Under such conditions, it was preferred to use a molar excess of oxygen based on the chlorine added.

On terminating the reaction, the solid chlorine was removed and analyzed. Analysis indicated that the chlorine contained oxides of chlorine, primarily in the form of chlorine dioxide. Based on the power consumption, conversion of the chlorine to the oxides of chlorine approached an efficiency of 100 percent.

EXAMPLE 4

The reaction of Example 3 was repeated wherein direct current was used instead of the alternating current. The direct current was supplied at substantially the same voltage, i.e., about 1500 volts root mean square and about 5 milliamperes root mean square. Under these conditions, the reaction could be effected only for a relatively short period of time due to the polarization of the electrodes. However, analysis of the chlorine removed from the reactor indicated that oxides of chlorine were produced at high efficiencies based on the power consumption. Chlorine dioxide comprised the major proportion of the oxides produced.

In addition to forming the oxides of chlorine, the oxides of other halogens such as bromine and fluorine can be produced in substantially the same manner. Thus, in place of liquid or solid chlorine, liquid or solid bromine or fluorine are used and the corresponding oxides are produced.

Also, it can be seen that the method of the present invention can be varied, as well as the reactor size, the placement of electrodes, the number of electrodes, and the like. Large scale production of the oxides can be effected using a bank or number of individual reactors or reactors of increased size and/or number of electrodes as described herein.

While there have been described various embodiments of the present invention, the methods described are not intended to be understood as limiting the scope of the invention. It is realized that changes therein are possible and it is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A process for the production of an oxide of chlorine comprising providing a body of liquid or solid chlorine and an atmosphere comprising gaseous oxygen in contact with the surface of the body of chlorine to thereby maintain the sum of the oxygen pressure and the chlorine pressure at less than one atmosphere of pressure, immersing a plurality of electrodes in the body of chlorine and impressing an electrical current across said electrodes to cause a glow discharge to form across said electrodes and into said atmosphere, causing interaction between the chlorine and oxygen at the surface of said body.

2. The method of claim 1 wherein said chlorine is in the liquid state whereby the oxides of chlorine having a higher density than the liquid chlorine are removed from the surface of said body by gravitational force into the body of liquid chlorine.

3. The process of claim 2 wherein the oxide of higher density than chlorine is chlorine dioxide.

4. The process of claim 1 wherein the glow discharge is produced by means of an alternating current.

5. The process of claim 4 wherein an ultraviolet light source radiates the glow discharge to thereby aid in reducing quenching of the plasma during the zero phase of the alternating current.

6. The process of claim 5 wherein the ultraviolet source is maintained out of phase with the alternating current.

7. The process of claim 4 wherein the process is run continuously by feeding replenishing amounts of liquid chlorine to a reaction zone, subjecting said liquid chlorine to a glow discharge in the presence of oxygen to produce oxides of chlorine, absorbing said produced oxides in said liquid chlorine and withdrawing a mixture of liquid chlorine and an oxide of chlorine from said reaction zone.

8. The process of claim 7 wherein oxygen is fed to the reaction zone at a rate sufficient to maintatin the total pressure within said zone substantially constant.

9. The process of claim 7 wherein the glow discharge is effected from the surface of said liquid chlorine through a reduced pressure zone containing oxygen, said reduced pressure zone being of about 5 microns to about 30 millimeters of mercury pressure and back to a surface of liquid chlorine thereby effecting ion and photon bombardment of said chlorine liquid surface.

10. The process of claim 7 wherein the oxides of chlorine are separated from the chlorine and the chlorine is returned to the reaction zone for further reaction.

11. The process of claim 1 wherein the glow discharge is effected under a reduced pressure of about 5 to 25 millimeters of mercury pressure.

12. The process of claim 1 wherein the chlorine is maintained at a temperature of $-120$ to $-35$ degrees centigrade.

13. The process of claim 1 wherein an oxide of chlorine produced is clorine dioxide.

References Cited

UNITED STATES PATENTS

| | | | |
|---|---|---|---|
| 523,263 | 7/1894 | Cannot | 204—164 |
| 2,689,217 | 9/1954 | Cotton | 204—164 |

OTHER REFERENCES

Y. Venkataramaiah, J. of Phys. Chem., vol. 27, pp. 74–80, 1923.

ROBERT K. MIHALEK, *Primary Examiner.*

U.S. Cl. X.R.

204—164, 312; 23—152